United States Patent [19]
Uchiyama

[11] 3,930,468
[45] Jan. 6, 1976

[54] EXHAUST GAS CLEANING MEANS FOR A ROTARY PISTON TYPE ENGINE

[75] Inventor: Yoshio Uchiyama, Hiroshima, Japan
[73] Assignee: Toyo Kogyo Co., Ltd., Japan
[22] Filed: Aug. 28, 1973
[21] Appl. No.: 392,345

[52] U.S. Cl. .................. 123/8.05; 60/304; 60/901
[51] Int. Cl.² ........................................ F02B 53/00
[58] Field of Search .............. 123/8.01, 8.45, 8.05; 418/61 A; 60/901, 304

[56] References Cited
UNITED STATES PATENTS

| | | | |
|---|---|---|---|
| 3,426,525 | 2/1969 | Rubin | 418/61 A UX |
| 3,519,373 | 7/1970 | Yamamoto | 418/61 A |
| 3,795,228 | 3/1974 | Shimizu | 123/8.01 |

Primary Examiner—C. J. Husar
Assistant Examiner—Michael Koczo, Jr.
Attorney, Agent, or Firm—Fleit & Jacobson

[57] ABSTRACT

In a rotary piston type engine comprising a rotor housing having exhaust port means, exhaust gas cleaning means comprising an auxiliary exhaust passage in the form of a cutout portion, and a secondary air port opening in a casing at the cutout portion. The cutout portion extends from the exhaust port means into a working chamber which is in the final part of expansion stroke.

4 Claims, 5 Drawing Figures

EXHAUST GAS CLEANING MEANS FOR A ROTARY PISTON TYPE ENGINE

The present invention relates to a rotary piston type internal combustion engine and more particularly to exhaust gas cleaning means therefor. More specifically, the present invention relates to exhaust gas cleaning means of such a type in which secondary air is introduced into a working chamber of a rotary piston engine so as to facilitate combustion of residual combustible components therein.

It has been a conventional practice for cleaning engine exhaust gas to supply secondary air into the gas so that noxious components such as carbon monoxide and hydrocarbon are completely burnt. In this instance, an increased cleaning efficiency is obtained under a higher exhaust gas temperature. Thus, in a rotary piston type engine including a casing which comprises a rotor housing having a trochoidal inner peripheral wall and a pair of side housings secured to the opposite sides of the rotor housing, and a polygonal rotor disposed in the rotor housing with apices sealingly contacting with the inner peripheral wall of the rotor housing so as to define working chambers which are variable in volume as the rotor rotates to effect intake, compression, combustion, expansion and exhaust strokes of the engine, it has been proposed to supply secondary air through an air port directly into the working chamber which is in the exhaust stroke. In this arrangement, however, the secondary air port is often clogged by deposits of residual fuel or lubricating oil. The secondary air may be, therefore, supplied to the working chamber which is in the final part of the expansion stroke at a position upstream side of the exhaust port. However, in this arrangement, since the pressure of the combustion gas is still high in the working chamber, it is very difficult to supply a sufficient amount of secondary air.

The present invention has an object to provide exhaust gas cleaning means for a rotary piston type engine which can eliminate the aforementioned diadvantages of prior art.

According to the present invention, the above object can be accomplished by auxiliary exhaust passage means in the form of a cutout portion or extending from the exhaust port provided on the rotor housing into the working chamber which is in the final part of the expansion stroke, and a secondary air port opening in the casing at the auxiliary exhaust passage. Thus, as one of the apices of the rotor passes through the auxiliary exhaust passage, a portion of high temperature combustion gas is allowed to flow at a high speed from the working chamber which is in the final part of the expansion stroke through the auxiliary exhaust passage. Thus, any deposits around the secondary air port is blown off by the combustion gas flow. At the same time, suction pressure is produced around the secondary air port so that a sufficient amount of secondary air is drawn into the casing.

The above and other objects and features of the present invention will become apparent from the following descriptions of preferred embodiments of the invention taking reference to the accompanying drawings; in which FIG. 1 is a sectional view of a rotary piston engine having exhaust gas cleaning means in accordance with one embodiment of the present invention;

Figure 1:
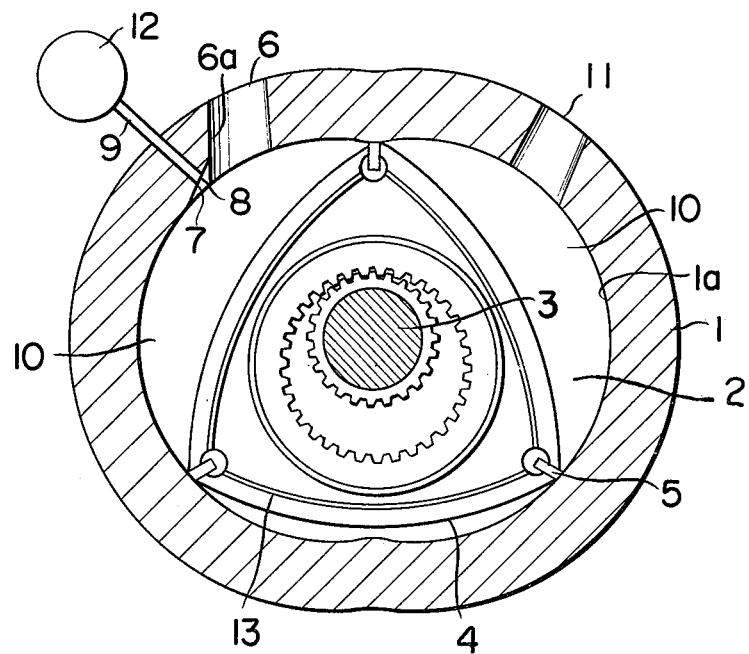
Figure 2:
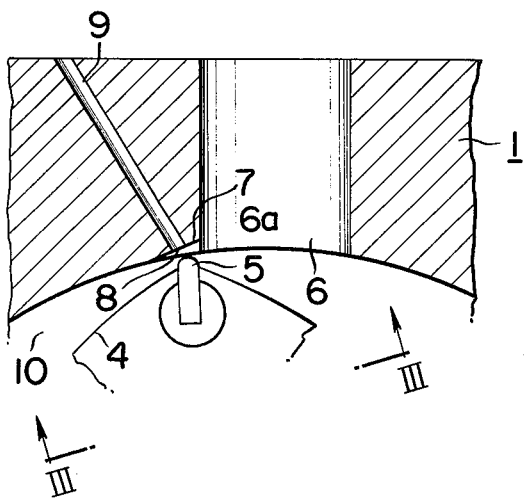
FIG. 2 is a fragmentary enlarged view of the engine shown in FIG. 1.
Figure 3:
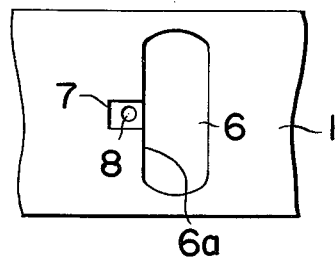
FIG. 3 is an enlarged plan view as seen substantially along the line III—III in FIG. 2.

Referring to the drawings, particularly to FIGS. 1 through 3, there is shown a rotary piston engine having a casing which comprises a rotor housing 1 and a pair of side housings 2 secured to the opposite sides of the rotor housing 1. The rotor housing 1 has a trochoidal inner peripheral wall 1a and a substantially triangular rotor 4 is disposed in the rotor housing 1 with the apex seals 5 thereon in sliding contact with the inner wall 1a. As is well known in the art, an output shaft 3 is eccentrically disposed in the rotor 4 and engage therewith to be driven by the rotor. Thus, working chambers 10 are defined between the inner wall 1a of the rotor housing 1 and the rotor 4.

Figure 4:
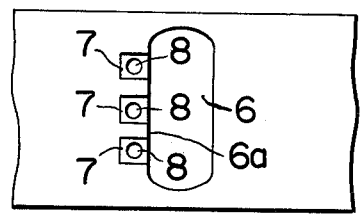
FIGS. 4 and 5 show modifications of secondary air port arrangement.
Figure 5:
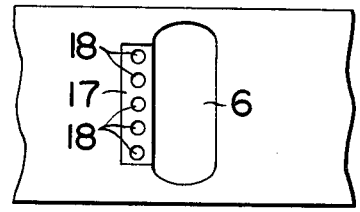

In the illustrated embodiment, an exhaust port 6 is provided in the rotor housing 1 and has a leading side 6a from which an auxiliary exhaust passage 7 extends toward the upstream side as shown in FIGS. 1 through 3. A secondary air supply passage 9 opens in the auxiliary exhaust passage 7 through a secondary air discharge port 8 and supplies secondary air from an air pump 12 to the auxiliary exhaust passage 7. In an altenative arrangement, a plurality of auxiliary exhaust passages 7 and secondary air discharge ports 8 may be provided as shown in FIG. 4. Further, the auxiliary exhaust passage may be of an increased width as shown by 17 in FIG. 5. In FIG. 1, the reference numeral 11 designates an intake port provided in the rotor housing 1 and 13 side seals provided on the rotor 4 in the manner as is well known in the art.

In operation, fuel-air mixture is introduced through the intake port 11 into the working chamber 10 which is in the intake stroke. As the rotor 4 rotates, the volume of the working chamber 10 is reduced so as to compress the mixture therein and thereafter combustion, expansion and exhaust strokes take place in the casing. According to the illustrated embodiment of the present invention, since the auxiliary exhaust passage or passages 7 are provided in the inner wall of the rotor housing 1 as described before, combustion gas in the working chamber 10 which is in the expansion stroke is allowed to flow at a high speed into the exhaust port 6 at the final part of the expansion stroke. The air pump 12 supplies on the other hand secondary air through the passage 9 and the port 8 to the cutout portion 7. Since the combustion gas passes at a high speed through the auxiliary exhaust passage 7 during the final part of the expansion stroke and the beginning part of the exhaust stroke, suction pressure is produced around the secondary air port 8 so that a sufficient amount of secondary air is introduced into the working chamber in the vicinity of the exhaust port 6 even when the gas pressure in the working chamber is still high. Thus, it is possible to burn combustible components in the exhaust gas under the existence of fresh secondary air.

The present invention has thus been shown and described with respect to preferred embodiments, however, it should be noted that the invention shall in no way limited to the details of the illustrated structures but modifications and changes may be made without departing from the scope of the appended claims.

I claim:

1. In a rotary piston type internal combustion engine including a casing which comprises a rotor housing having a trochoidal inner peripheral wall and a pair of side housings secured to the opposite sides of the rotor housing, said rotor housing being provided with exhaust port means, a polygonal rotor disposed in the rotor housing with apices sealingly contacting with the inner peripheral wall of the rotor housing so as to define working chambers which are variable in volume as the rotor rotates to effect intake, compression, combustion, expansion and exhaust strokes of the engine, and exhaust gas cleaning means for introducing secondary air into the working chamber which is in the exhaust stroke, characterized by the fact that said exhaust gas cleaning means comprises: a cutout portion provided on the trochoidal inner peripheral wall of the rotor housing extending from said exhaust port means in the direction substantially opposite to the direction of rotation of said rotor and directly communicating the exhaust port means with the working chamber during the final part of the expansion stroke when the apex seal at the leading edge of the working chamber during the final stage of the expansion stroke intersects said cutout portion and before said apex seal is aligned with the leading edge of said exhaust port means to expose said exhaust port to said working chamber, and a secondary air supply passage for introducing secondary air into said working chamber having a secondary air discharge port defined by the intersection of said supply passage and said cutout portion so that a portion of the gas in the working chamber which is in the final stage of the expansion stroke can flow directly into said exhaust port means through said cutout portion and past said secondary air discharge port from said working chamber to prevent any material from adhering to said discharge port and to create a suction pressure at that port for facilitating the supply of secondary air to said working chamber in the vicinity of said exhaust port.

2. A rotary piston engine in accordance with claim 1 in which said cutout portion is provided with a single secondary air port.

3. A rotary piston engine in accordance with claim 1 in which said cutout portion is provided with a plurality of secondary air ports.

4. A rotary piston engine in accordance with claim 1 in which said exhaust gas cleaning means includes a plurality of cutout portions each of which has a secondary air port.

* * * * *